United States Patent [19]
Todd et al.

[11] Patent Number: 5,260,548
[45] Date of Patent: Nov. 9, 1993

[54] SOLDERING SYSTEM CONTROLLED POWER SUPPLY APPARATUS AND METHOD OF USING SAME

[75] Inventors: Thomas Todd; Paul M. Lindberg, both of San Diego, Calif.

[73] Assignee: Toddco General, Inc., San Diego, Calif.

[21] Appl. No.: 483,680

[22] Filed: Feb. 23, 1990

[51] Int. Cl.$^5$ .............................................. H05B 1/02
[52] U.S. Cl. .................... 219/483; 219/486; 219/501; 219/492; 219/85.1
[58] Field of Search ............... 219/483, 486, 497, 501, 219/85.1, 85.11, 85.21

[56] References Cited

U.S. PATENT DOCUMENTS

| | | | |
|---|---|---|---|
| 3,749,879 | 7/1973 | Armstrong | 219/441 |
| 4,516,525 | 5/1985 | Bourgeois et al. | 219/275 |
| 4,785,149 | 11/1988 | Gilliland | 219/130.21 |
| 4,788,404 | 11/1988 | Kent | 219/85.1 |
| 4,833,301 | 5/1989 | Furtek | 219/388 |
| 4,849,611 | 7/1989 | Whitney et al. | 219/482 |
| 5,021,634 | 6/1991 | Santoro et al. | 219/241 |

Primary Examiner—Mark H. Paschall
Attorney, Agent, or Firm—Bernard L. Kleinke; Jerry R. Potts

[57] ABSTRACT

An apparatus which provides selectively either constant power, constant current or constant voltage to the heating elements of the thermods. The soldering system power supply apparatus includes devices for monitoring and controlling individual temperature profiles of each soldering thermod heating element. A computerized arrangement controls the power to each thermod in a very accurate manner. For the purpose of adjusting the power to each thermod element as a function of its temperature and the desired temperature profile, a set of temperature sensors are coupled to each of the thermod elements for measuring its temperature. Similarly, a set of energy sensors are also coupled to each of the thermod elements for detecting the amount of electrical energy supplied to each thermod.

24 Claims, 10 Drawing Sheets

SOLDERING SYSTEM CONTROLLED POWER SUPPLY APPARATUS AND METHOD OF USING SAME

CROSS-REFERENCE TO RELATED APPLICATIONS

Co-pending U.S. patent application, entitled "SOLDERING SYSTEM AND METHOD OF USING SAME", filed Feb. 23, 1990, assigned Ser. No. 07/484,382 now U.S. Pat. No. 5,033,665 is hereby incorporated by reference, as if fully set forth herein.

TECHNICAL FIELD

The present invention relates in general to soldering system controlled power supply apparatus, and more particularly relates to a power supply apparatus for energizing electrically thermods used in the assembly of electronic components to circuit boards.

BACKGROUND ART

Conventional soldering systems, such as systems which have included reflow soldering apparatus, are used in the assembly of miniature electronic circuit components to circuit boards. Such an apparatus is typically used to affix the circuit components, such as surface mount devices, to the circuit boards. Such apparatus includes an electrically energizable thermod for reflowing solder that has been pre-deposited on the circuit board and/or the leads of the surface mount device.

There are many different types and kinds of thermods employed for providing sufficient heat to cause the reflowing of solder Such thermods have included small metal heating blades, which are connected electrically to a reflow power supply system for providing the required electrical current to heat the blades to soldering temperatures. The heated blades of the thermod cause the pre-deposited solder to flow, and connect the component or device to the circuit board when the solder is subsequently cooled and solidified.

One particular type of thermod includes a set of four blades configured in a generally rectangular or boxlike configuration, for connecting to a circuit board a conventional rectangularly shaped electronic component, such as an integrated circuit chip. The heating elements are typically electrically connected in parallel. However, such an electrical connection can cause a nonuniform electrical current distribution, and thus an undesirable temperature distribution. The resulting solder connection can be improper, and thus unacceptable. The costly assembled board can then be determined to be a reject.

The typical problem is compounded by the conventional thermod electrically conductive material used in the heating element construction. The material can exhibit a negative resistance versus temperature characteristic, such that as the temperature of an element increases, its resistance decreases. Therefore, in a parallel connection, if one element reaches a substantially higher temperature relative to its counterparts, the hottest element tends to draw substantially more current because of its lower resistance, which, in turn, causes it to heat even further. This runaway phenomenon can cause non-uniform heating by the thermod. Thus, for example, if a four-sided electronic component is being mounted to a typical electronic circuit board, one side of the component receives excessive heat which may either damage the component, or damage the circuit board. The other three elements receive insufficient heat, which may cause improper attachment of the component leads to the circuit board.

Therefore, it would be highly desirable to have a controlled soldering system power supply apparatus and method of using it, to provide uniform heating without causing damage to the delicate electronic components of the electronic chip, and without causing improper attachments of the leads of the chip to the circuit board.

Another problem associated with conventional reflow power supply systems has been the difficulty of using a single power source system for heating a variety of different kinds of reflow solder blades. In this regard, with the advent of new heat conductive materials, certain reflow solder thermods exhibit negative temperature coefficient characteristics, while others exhibit positive temperature coefficient characteristics. In other words, some materials become less electrically resistive, as their temperature rises, while other materials become more electrically resistive as their temperature rises.

In order to change thermods from one type of soldering application to another, it would be necessary to change power supplies. Also, different electrical parameters must be varied, depending on the type of material used in the thermod. For example, when the thermod material is composed of a negative temperature coefficient material, when the resistance of the material decreases with increasing temperature, the current to the thermod should be increased with increasing temperature, if the voltage output of the supply is to remain constant. Alternately, the voltage output of the reflow solder power supply should be decreased with increasing temperature, if the current is to remain constant.

In a similar manner, when the thermod material is composed of a positive temperature coefficient material, when the resistance of the material increases with increasing temperature, the current to the thermod should be decreased with increasing temperature to maintain the voltage output of the supply constant. Alternatively, the voltage output of the supply should be increased with increasing temperature, if the current is to remain constant. As a result of the foregoing, most reflow soldering systems must be limited to one type of thermod or the other. Thus, the soldering capabilities of the system are limited. In order to increase the capabilities of such system, a multiple number of power supply types would be required. The power supplies would either serve as a constant current source, or as a constant voltage source. However, such duplication of power supplies makes the system more expensive to manufacture and maintain, and also makes the system more prone to operator errors if the operator fails to change power supplies according to the type of soldering head being employed. The change over time required during the operation of the system, can produce undesirable and unwanted delays.

Therefore, it would be highly desirable to have a new and improved controlled power supply apparatus, which could be used with a variety of different kinds of thermods, composed of a variety of different types of materials, both negative and positive temperature coefficient materials, for a variety of applications. Also, it is important to eliminate the need for a duplication of power supplies.

DISCLOSURE OF INVENTION

Therefore, the principal object of the present invention is to provide a new and improved soldering system controlled power supply apparatus and method of using it, wherein the apparatus provides uniform heat for a variety of soldering applications.

Briefly, the above and further objects are realized in accordance with the present invention by providing an apparatus which provides selectively either constant power, constant current or constant voltage to the heating elements of the thermods.

The soldering system power supply apparatus includes devices for monitoring and controlling individual temperature profiles of each soldering thermod heating element. A computerized arrangement controls the power to each thermod in a very accurate manner. For the purpose of adjusting the power to each thermod element as a function of its temperature and the desired temperature profile, a set of temperature sensors are coupled to each of the thermod elements for measuring its temperature. Similarly, a set of energy sensors are also coupled to each of the thermod elements for detecting the amount of electrical energy supplied to each thermod.

The thermods are controlled electrically and independently of one another to supply thermod energy to a plurality of soldering surfaces in accordance with the predetermined temperature profile as a function of time. Each individual thermod includes a heating element for converting electrical energy to thermal energy, and a thermod blade for transferring only thermal energy to the soldering surface for the purpose of reflowing solder deposited thereon.

The method of using the system includes sensing the temperature of each of the thermod blades and generating a set of electrical signals that are indicative of their temperatures. The generated electrical signals are then compared with a set of temperature command signals generated by the microprocessor, which are indicative of a desired temperature for each of the thermod blades. An equivalence between the generated and the command signals indicates the thermod blades are at the desired temperature commanded by the microprocessor. In response to a non-equivalence between the generated signals and the command signals, the power supplied to each of the thermods is adjusted selectively until an equivalence between the generated and the command signals is obtained.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
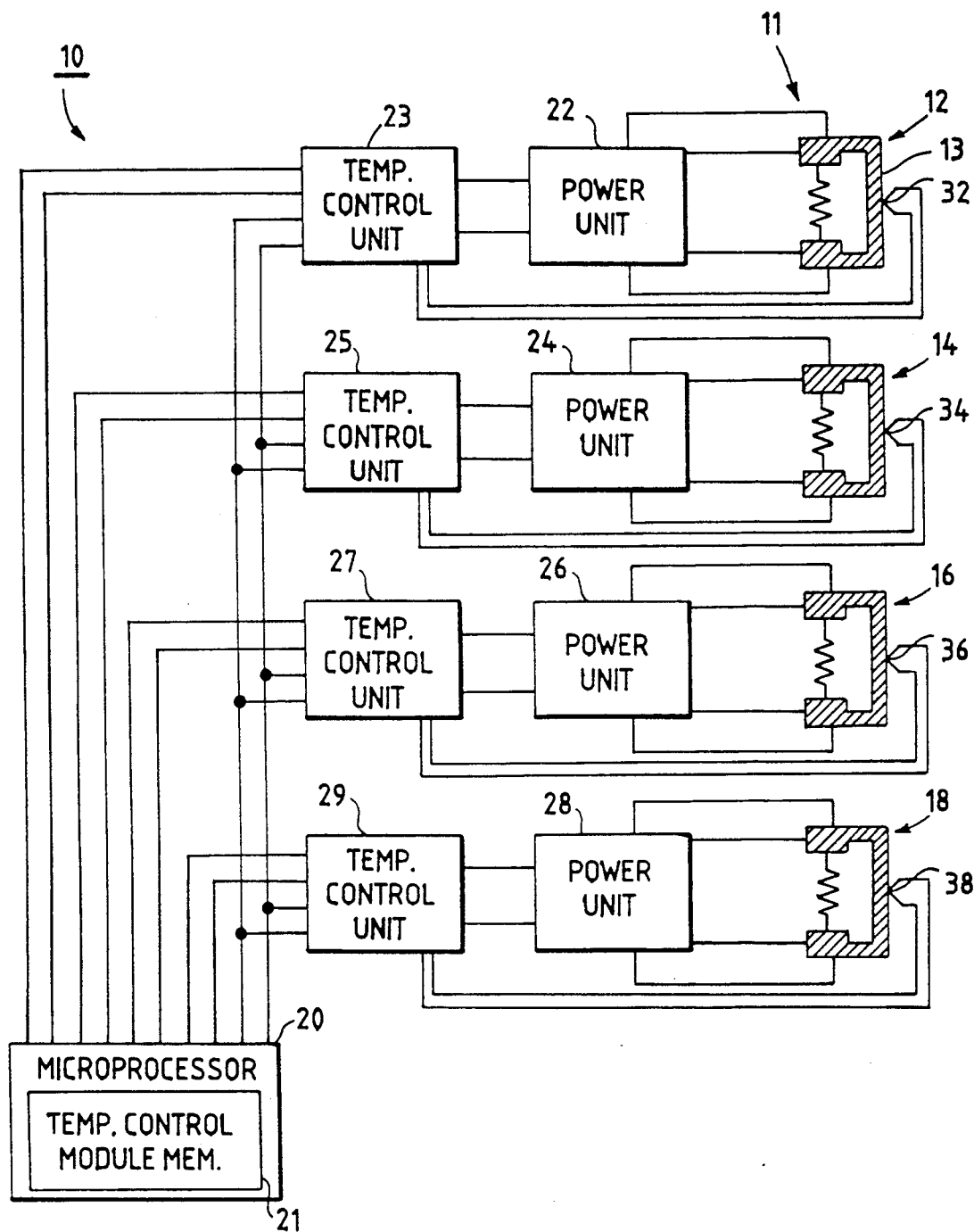
FIG. 1 is a symbolic block diagram of a soldering system controlled power supply apparatus, which is constructed in accordance with the present invention and showing the system connected to a set of four thermod heating blades.

Referring now to FIG. 1 of the drawings, there is shown a soldering system controlled power supply apparatus 10, which is constructed in accordance with the present invention, and which is connected to a reflow soldering head shown generally at 11. The reflow soldering head 11 includes a set of four thermods 12, 14, 16 and 18 for facilitating a reflow soldering operation. Each thermod includes a single thermod heating blade, such as a blade 13 of the thermod 12, for heating a soldering material to soldering temperatures to connect the leads (not shown) of an electronic circuit component or device (not shown) to a printed circuit board (not shown).

Each blade, such as the blade 13, is composed of a heat conductive, electrically insulative ceramic material. Each thermod also has a heating element, such as the element shown generally at 15, for converting electrical energy into thermal energy to raise the temperature of its associate blade, such as the blade 13. Each heating element, such as heating element 15 is composed of an electrically conductive, heat conductive material which permits electrical energy to be easily and readily converted into thermal energy.

Such a ceramic reflow solder device is disclosed in pending U.S. patent application, Ser. No. 07/311,655, filed Feb. 15, 1989.

In the preferred form of the present invention, the heating element 15 has a negative temperature coefficient characteristic so that as the temperature of the heat conductive material increases its electrical resistance decreases. It should be understood however, that other types and kinds of thermod heating elements, such as those with positive temperature coefficient characteristics can also be employed with the apparatus 10.

The apparatus 10 of the present invention enables the temperature of the individual thermod blades, such as blade 13, to be measured continuously in a highly accurate manner to control the amount of electrical energy, supplied to each of the heating elements, such as element 15, for heating uniformly each one of the blades to a desired soldering temperature. Thus, defective solder connections are eliminated or at least greatly reduced.

Figure 10:
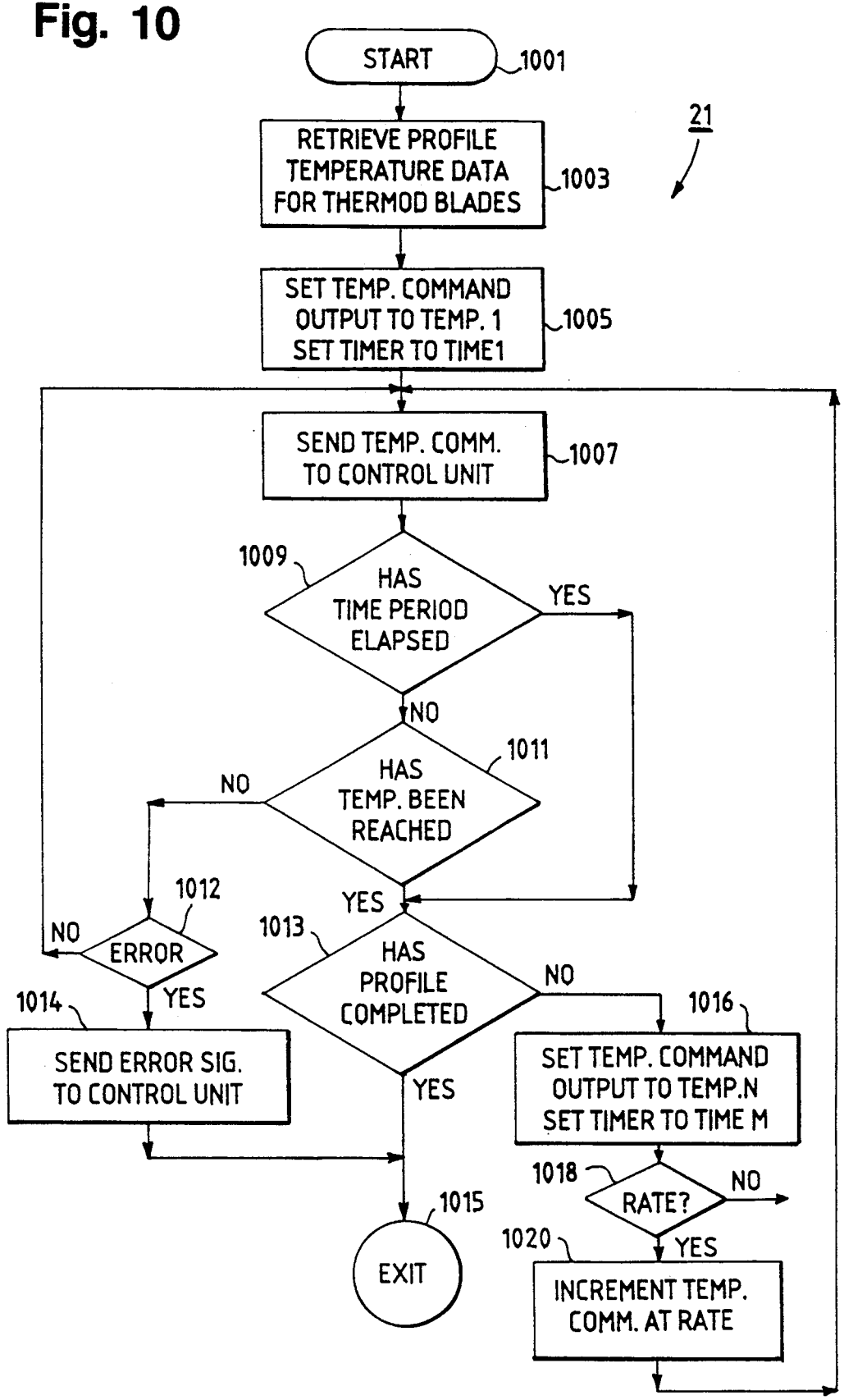
FIG. 10 is a flow chart of the computer program controlling the computer for the apparatus of FIG. 1.

Considering now the power supply apparatus 10 in greater detail, the apparatus 10 generally comprises a microprocessor 20 for controlling the temperature profiles of each of the thermods 12, 14, 16 and 18, the execution of which is controlled by a computer program as shown in flow chart form in FIG. 10. A temperature control module memory 21 of the microprocessor 20 stores the program, which, when executed, determines iteratively, a desired driving voltage to produce a given temperature profile for each of the thermods 12, 14, 16 and 18 as a function of time. The program is referred to a temperature control module. The temperature profile is illustrated in chart form in FIG. 2.

As will be explained hereinafter in greater detail, the power required by any one of the thermods, such as thermod 12, is directly proportional to electrical energy required to heat the thermod to a given temperature. Accordingly, the temperature control module stored in the memory 21, when executed, determines iteratively, under certain environmental conditions, thermod electrical characteristics, and thermod temperature conditions, the best driving profile or command temperature as a function of time to yield a desired thermod temperature profile, such as the one indicated in FIG. 2. In this regard, it should be understood that the digital output data derived by the temperature control module is supplied to a digital to analog converter module (not shown) for generating an energy control signal hereinafter referred to as the temperature command signal ($V_{CT}$).

For the purpose of supplying electrical energy to each of the thermods 12, 14, 16 and 18, the reflow power supply apparatus 10 also includes a set of power units 22, 24, 26 and 28 coupled to the thermods 12, 14, 16 and 18, respectively. Each power unit, such as power unit 22, is capable of adjusting its output power to maintain the temperature of its associated thermod at a given temperature level. Each of the power units 22, 24, 26 and 28 are substantially identical to one another, so that only power unit 22 will be described hereinafter in greater detail.

For the purpose of interfacing the microprocessor 20 with each of the power units 22, 24, 26 and 28, the reflow power supply system 10 also includes a set of temperature control units 23, 25, 27 and 29, which couple signals between the microprocessor 20, and the power units 22, 24, 26 and 28 respectively. A set of thermocouples 32, 34, 36 and 38 are connected between the temperature control units 23, 25, 27 and 29 respectively, and the blades of thermods 12, 14, 16 and 18 respectively, for sensing the temperature of the blades, such as blade 13. In this regard, in response to temperature command signals received from the microprocessor 20 and measured temperature signals received from the thermocouple 32, 34, 36 and 38, each respective control unit, such as control unit 23, generates an error signal for causing the power units, such as power unit 22, to adjust its power output to the thermods. Each of the temperature control units 23, 25, 27 and 29 are substantially identical and only temperature control unit 23 will be described hereinafter in greater detail.

The thermocouples 32, 34, 36 and 38 are conventional type J thermocouples. The thermocouples are in the form of thermocouple wire pairs, such as those manufactured by ThermX, of San Diego, Calif. The ends of the wire pairs are welded to the thermod blades, so as to generate a highly accurate and reliable signal indicative of the temperature of an associated blade.

In order to produce the desired temperature profile in the blade 13, the microprocessor 20 generates a temperature command signal that is indicative of a desired temperature profile in a given thermod blade, such as the thermod blade 13, over a selected period of time. For example, referring to FIG. 2 a typical temperature profile would include pre-heating the blade 13 to a first temperature (T1), ramping the temperature of blade 13 up to a flux actuating temperature (T2) at a rate (R1); holding or maintaining the (T2) temperature for a fixed time period ($t_2$); ramping the temperature of the blade 13 up to a solder reflow temperature (T3) at a rate R2; holding or maintaining the solder reflow temperature T3 for a fixed time period ($t_3$); and ramping the temperature of the blade 13 down to the pre-heating temperature T1 at a rate of R3, and maintaining the pre-heating temperature T1 for either a minimum or maximum pre-heating time period $t_1$ or $t_4$ respectively. The temperature command unit signal generated by microprocessor 20 is then compared with a sensing signal that is indicative of the actual temperature of the thermod blade 13 as measured by its associated thermocouple 32. If there is a difference between the temperature command signal and the sensing signal the power unit 22 is activated for adjusting and supplying the power to the thermod 12. If there is no difference between the temperature command signal and the sensing signal, the output power energy of the power unit 22 is maintained at a constant level to control the amount of power that is supplied to the thermod 12 for uniformly heating the blade 13 to a desired temperature.

Figure 3:
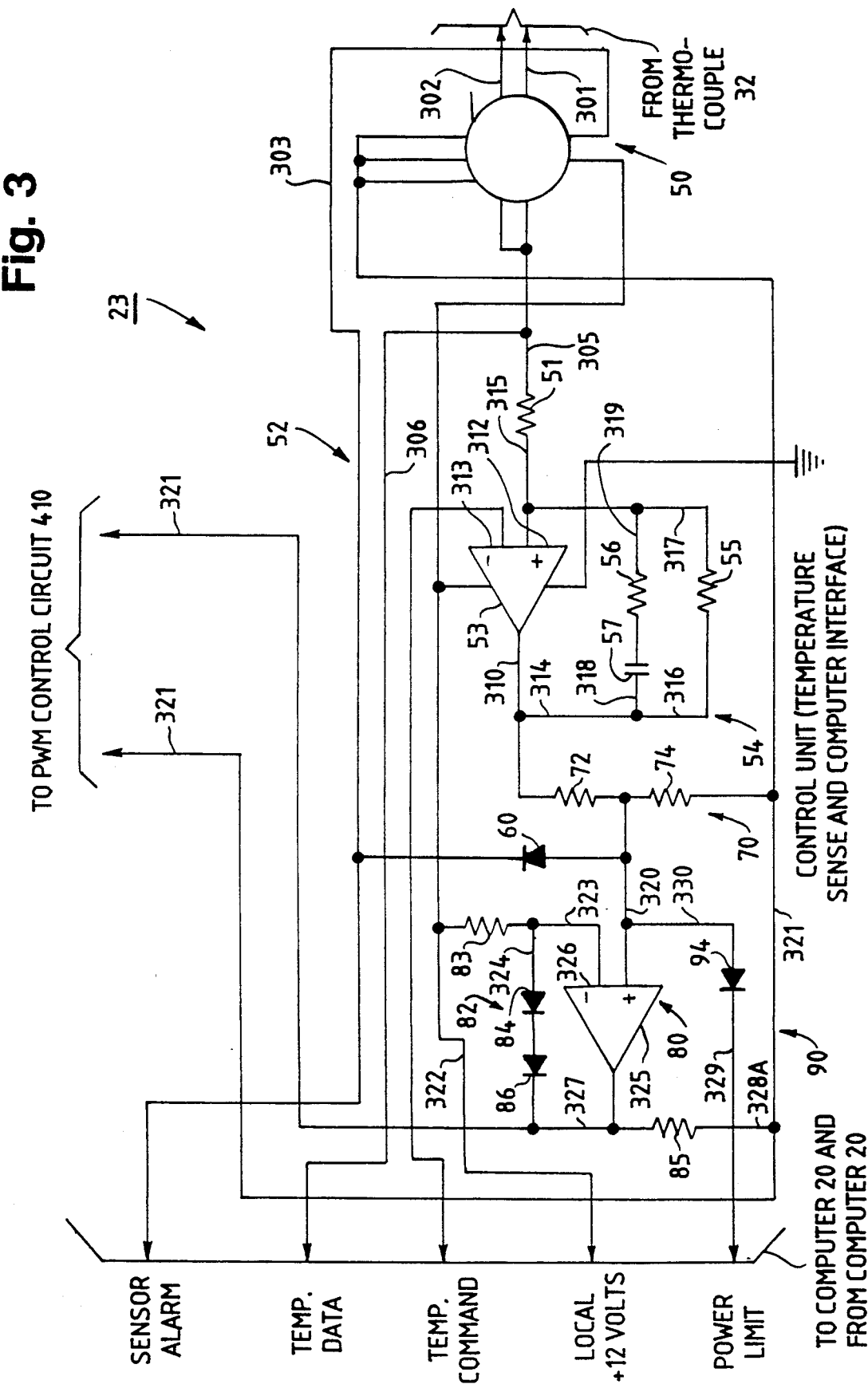
FIG. 3 is a schematic drawing of one of the control units of the power supply apparatus of FIG. 1.

Considering now the temperature control unit 23 in greater detail with reference to FIGS. 1 and 3, the temperature control unit 23 is powered by a local +12 VDC power source in the microprocessor 20, and generally comprises a thermocouple amplifier 50 which converts a thermocouple voltage from the thermocouple 32 into a scaled analog voltage. In this regard, the output voltage of the thermocouple 50 is scaled to ten millivolts per degree centigrade, referenced to zero degrees centigrade at zero volts. The output voltage signal of the thermocouple amplifier 50 is indicative of the actual temperature of the blade 13.

For the purpose of comparing the output voltage of the thermocouple amplifier 50 with the temperature command signal generated by the microprocessor 20, the temperature control unit 23 also includes an error amplifier 52 that generates an error output signal whenever there is a non-equivalence between the temperature command signal generated by the microprocessor 20 and the voltage signal generated by the thermocouple amplifier 50. The error output signal of the error amplifier 52 is coupled to the power unit 22 on lead via a selector switch 39 (FIG. 7) that permits the power unit 22 to operate in one of three mutually exclusive modes of operation: a constant power mode, a constant current mode, or a constant voltage mode as will be explained hereinafter in greater detail. A return or sense ground is provided between the power unit 22 and the control unit 23 by lead 321.

Considering now the temperature control unit 23 in still greater detail with reference to FIG. 3, the temperature control unit 23 via its thermocouple amplifier 50 provides a temperature data voltage signal to the microprocessor 20 that is proportional to the temperature of the thermod blade 13. The temperature control unit also generates a control signal (PPS) via the error amplifier 52 to power unit 22. The control signal PPS produced by the error amplifier 52 is indicative of a time integral of the difference between the temperature data signal generated by the thermocouple amplifier 50 and the temperature command signal generated by the microprocessor 20. In this regard, it should be understood that the error amplifier 52 configuration is conventional and will only be briefly described.

Considering now the thermocouple amplifier 50 in greater detail with reference to FIG. 3, the thermocouple amplifier 50 is a conventional integrated circuit manufactured by ANALOG DEVICES CORPORATION under part number AD596. The thermocouple amplifier 50 includes a pair of input pins connected to the thermocouple 32 by leads 301 and 302 respectively. In order to disable the temperature control unit 23 in the event of an open circuit to the thermocouple 32, the thermocouple amplifier 50 generates a sensor alarm signal that is coupled to the microprocessor 20 by lead 303. The sensor alarm signal is also coupled to the error amplifier 52 via a diode 60 for causing the error amplifier 52 to be disabled. In this regard, if the thermocouple 32 fails open, the error signal is pulsed low which automatically shuts down the system 10.

The output signal of the thermocouple amplifier 50 that is indicative of the temperature of the blade 13 is connected to the error amplifier 52 on lead 305 for the purpose of providing a temperature data signal that may be compared with the temperature command signal generated by the microprocessor 20. In order to provide a closed loop power system, the temperature data signal generated by the thermocouple amplifier 50 is also connected to the microprocessor 20 by the lead 306.

Considering now the error amplifier 52 in greater detail with reference to FIG. 3, the error amplifier 52 generally comprises a comparator 53 for comparing the output voltage or temperature data signal generated by the thermocouple amplifier 50 with the voltage or temperature command signal generated by the microprocessor 20. The comparator 53 generates an error output signal that is coupled to a buffer amplifier 80 by lead 310 through a voltage divider 70 adjusting the error output signal to compensate for shifts in the ground reference between the power unit 22 and the control unit 23. The comparator 53 includes a positive input terminal 313 and a negative input terminal 312. The positive input terminal 313 is connected to the microprocessor 20 for receiving the temperature command signal ($V_{CT}$). The negative input terminal 312 of the comparator 53 is connected to the output of the thermocouple amplifier 50 via resistor 51 so that the output voltage of the thermocouple amplifier 50 may be compared with the temperature command signal generated by the microprocessor 20. The resistor 51 is a 10K ohm resistor. The comparator 53 is an LM358 integrated circuit manufactured by National Semiconductor.

For the purpose of limiting the gain band width of the error amplifier 52, a compensation network 54 is connected between the output of the comparator 53 by leads 310 and 314 and the input terminal 312 and resistor 51 by leads 315 and 317. The compensation network 54 comprises a resistor 55 that is connected in parallel across a series connected resistor 57 and capacitor 57 that connected between the output of comparator 53 via leads 310, 314 and 318 and the input terminal 312 of the comparator 53 via leads 315 and 317. Resistor 55 is a 500K ohm resistor, resistor 56 is a 1K ohm resistor, and capacitor 57 is a 0.1 μfarad capacitor.

Considering now the buffer amplifier 80 in greater detail with reference to FIG. 3, the buffer amplifier 80 is conventional operational amplifier having a positive input 325 coupled to the output of the comparator 53 via the voltage divider network 70. In this regard, the positive input 325 of the buffer amplifier 80 is connected between a pair of resistors 72 and 74 that form the voltage divider network 70. Resistor 72 is connected between the output of the comparator 53 via the lead 310 and the input 325 of the buffer amplifier 80 by lead 320, while the resistor 74 is connected between the input 325 of the buffer amplifier and the resistor 72 by lead 320 and ground by lead 321. Resistor 72 is a 10K ohm resistor and resistor 74 is a 100K ohm resistor.

For the purpose of providing biasing to the buffer amplifier 80, the buffer amplifier 80 has a negative input 326 that is coupled to a reference voltage feedback network 82. The feedback network 82 is coupled between the output of the buffer amplifier 80 by lead 327 and the local +12 VDC reference voltage supplied by the microprocessor 20. A return path to ground is provided by a resistor 85 that is connected between the output of buffer amplifier 80 by lead 327 and ground by lead 328A. Resistor 85 is a 10K ohm resistor. The feedback network 82 is comprised of a resistor 83 coupled between the local +12 VDC reference voltage source by lead 322 and the negative input 326 of the buffer amplifier 80 by lead 323 and a pair of series connected diodes 84 and 86 connected between the negative input 326 by lead 324 and the output of the buffer amplifier 80 by lead 327. Resistor 83 is a 10K ohm resistor and diodes 84 and 86 are both IN4148 diodes manufactured by National Semiconductor.

Figure 2:
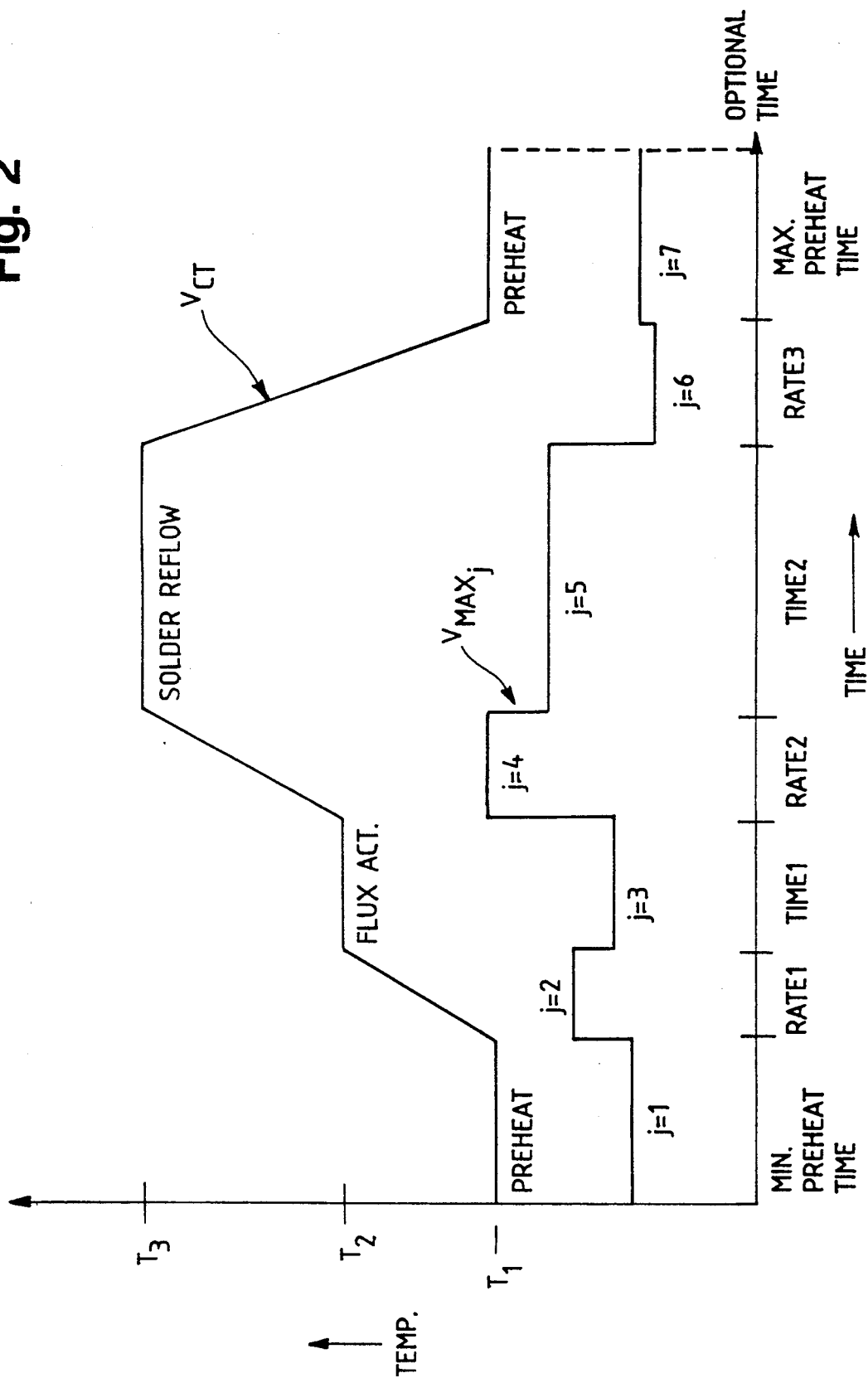
FIG. 2 is a temperature versus time chart illustrating a temperature profile for a thermod as a function of time.
Figure 7:
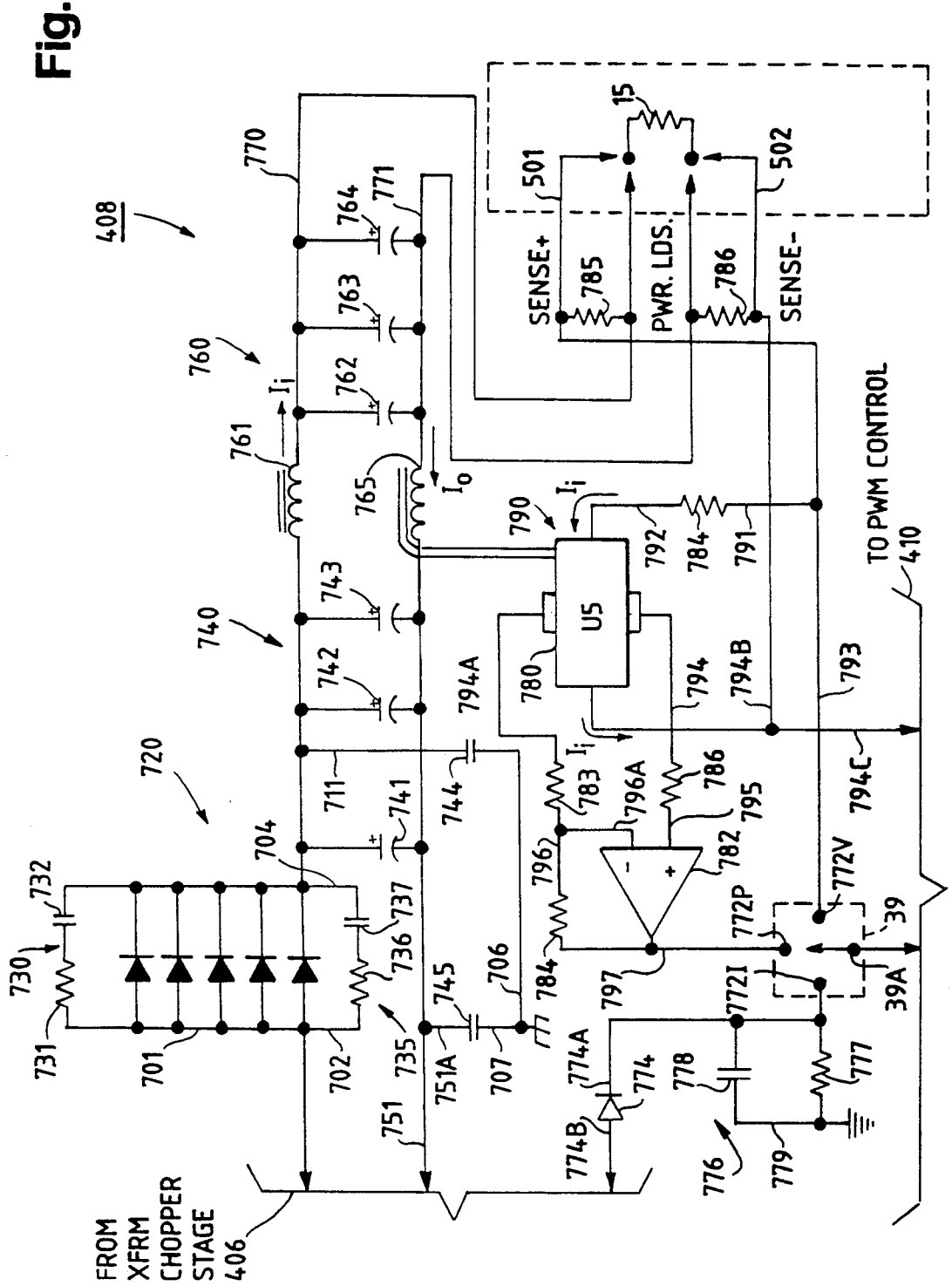
FIG. 7 is a schematic diagram of the output rectifier/filter of the power unit of FIG. 4.

For the purpose of limiting the power output of the power unit 22, the interface unit 23 also includes a power limiting network 90 for protecting the thermod blade 13. The power limiting network generally comprises a diode 94 and the diode 60 that cause the input signal to the buffer amplifier to be limited. In this regard, the microprocessor 20 generates a power limit signal that is coupled to the positive input pin 325 of the buffer amplifier 80 via the diode 94. The cathode of a diode 94 is coupled to microprocessor 20 power limit signal by the lead 329 while the anode of diode 94 is connected to the input terminal 325 of the buffer amplifier 80 via lead 330. Buffer amplifier 80 is a conventional operational amplifier, such as a model LM358N or its equivalent manufactured by National Semiconductors. As best seen in FIGS. 2 and 7, the output of the buffer amplifier 80 is connected by lead 327 to a common node 39A of the mode selection switch 39 that will be described hereinafter in greater detail.

Figure 4:
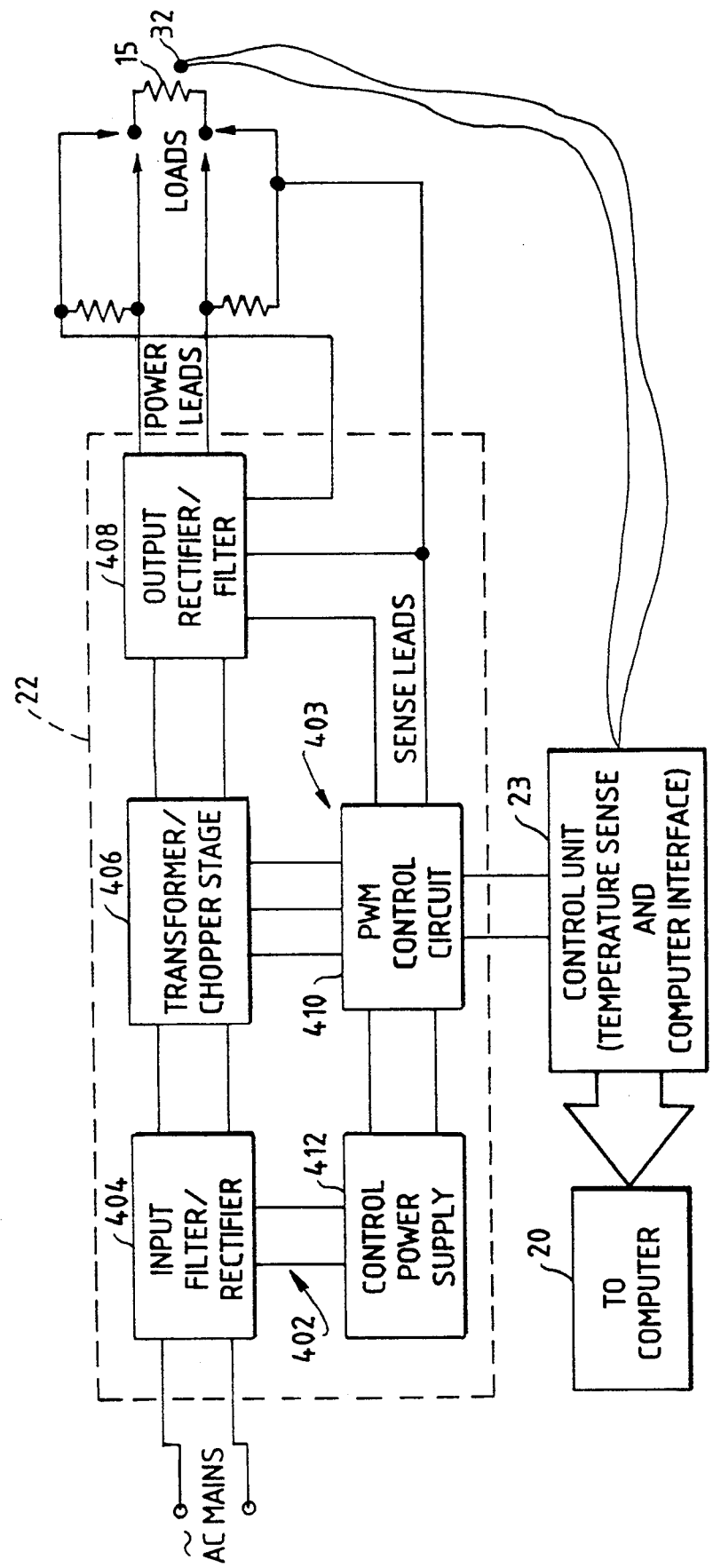
FIG. 4 is a block diagram of a computer and one of the power units of the apparatus, showing the power unit coupled between one of the thermod heating blades and one of the control units.

Considering now the power unit 22 in greater detail with reference to FIG. 4, the power unit 22 generally comprises a flyback converter 402 for supplying electrical energy to the thermod heating element 15 and a control circuit 403 for causing the output power of the flyback converter 402 to be adjusted in response to the error output signal generated by the temperature control unit 23. In this regard, the power unit 22 adjusts its output power in response to the error output signal generated by the temperature control unit 23 so that the temperature of the blade 13 is maintained at the command temperature level provided by the microprocessor 20. It should be understood that the maximum mean output voltage (Vmaxj) of the power unit 22 is limited by the maximum voltage rating for any given thermod; thus, Vmaxj will usually be determined empirically and partly by the following formula:

$$Vmaxj = \frac{2.7 \times 10}{\text{Thermod limit}} * \frac{dT_{(t)}}{dt} * \frac{1}{200} * \frac{Tj}{400}$$

where:

$V_{maxj}$ = $V_{max}$ for a given period $j = 1 \ldots 7$ as shown in FIG. 2 for example;

Thermod Limit = Maximum voltage rating for a given thermod, typically 0.5 volts to 2.7 volts;

$T_{(t)}$ = Real-time programmed temperature expressed in degrees centigrade; and $T_j$ = Mean temperature in degrees centigrade in any segment.

As best seen in FIG. 2, the voltage level (Vct) of the signal that is indicative of the temperature command signal is a function of the voltage level ($V_{MT}$) indicative of the thermod measured temperature and the desired temperature profile. For example, assuming the command temperature signal ($V_{CT}$) is 0.5 volts and is scaled 10 millivolts per degree centigrade and the measured temperature signal ($V_{MT}$) is 0.4 volts and is scaled 10 millivolts per degree centigrade, the power unit 22 will adjust its output energy to raise the temperature of the thermod to 50° C. very quickly.

Considering now the flyback convertor 402 in greater detail with reference to FIG. 4, the flyback converter 402 generally includes an input filter/rectifier 404 that converts a conventional 60 cycle alternating current 110 volt or 220 volts line service (not shown) into a direct current high voltage typically in the range of 250 VDC to 350 VDC with substantially no ripple. A transformer/chopper stage 406 coupled to the direct current high voltage output of the input filter/rectifier 404 converts the direct current high voltage power into a low voltage, high current source for supplying electrical energy to the heating element 15 as will be explained hereinafter in greater detail.

For the purpose of providing a smooth direct current energy source to the heating element 15, the flyback converter 402 also includes an output rectifier/filter 408 that is coupled between the output of the transformer/chopper stage 406 and the heating element 15. The output rectifier/filter 408 also includes a voltage and current sensing arrangement for permitting the output power parameters of the output/rectifier/filter to be monitored for power control purposes as will be explained hereinafter in greater detail.

Figure 8:
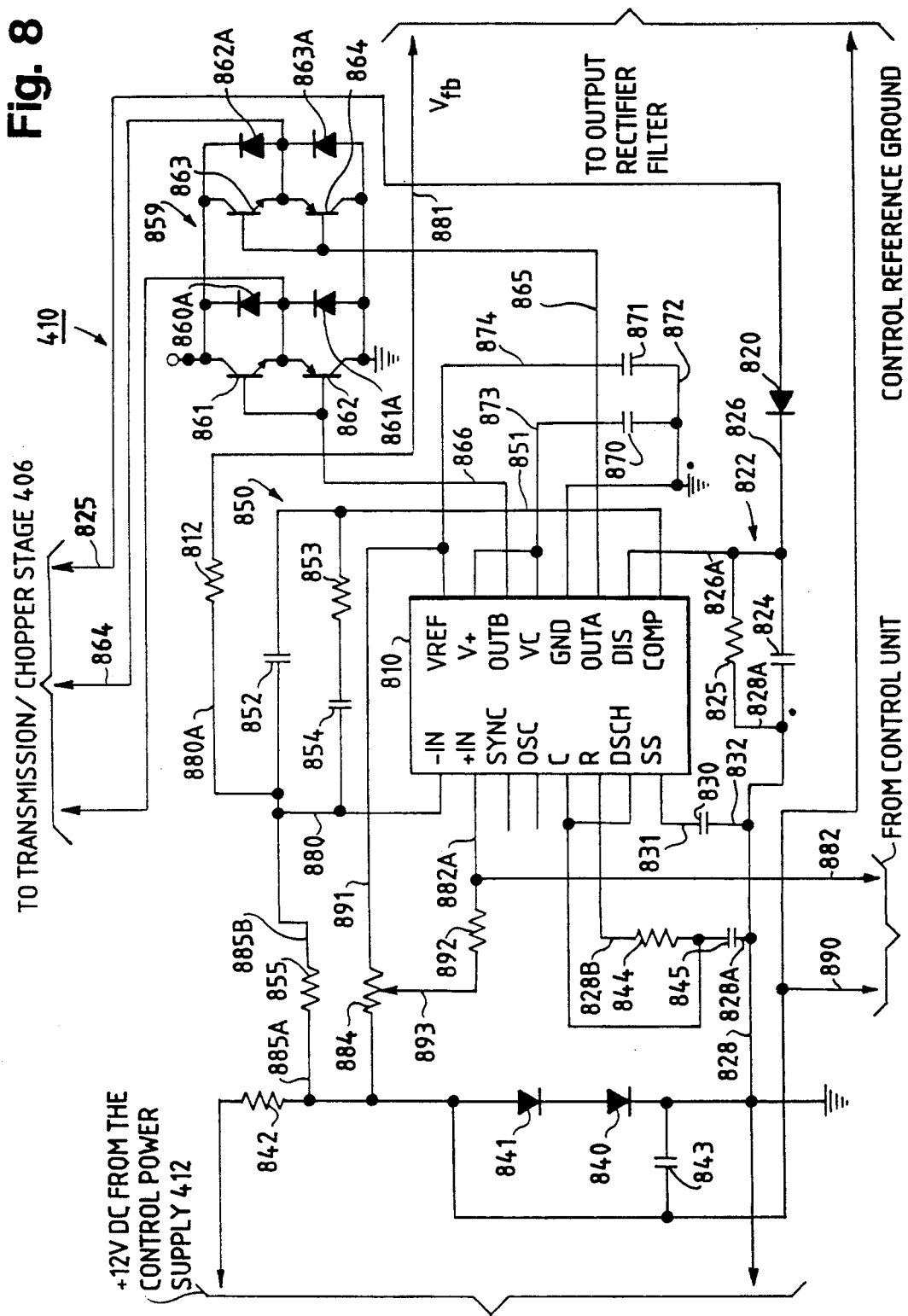
FIG. 8 is a schematic diagram of the pulse width modulation control circuit of the power unit of FIG. 4.

Considering now the control circuit 403 in greater detail with reference to FIGS. 4 and 8, the control circuit 403 generally comprises a conventional pulse width modulated control circuit 410 using a commercially available integrated control chip or controller 810 manufactured under the part number SG3525. The pulse width modulated control circuit 410 controls the power output of the power unit 22 by modulating the duty cycle of the power delivered to the heating element or load 15 as will be explained hereinafter in greater detail.

The control circuit 403 also includes a control power supply 412 for providing power to the pulse width modulated control circuit 410. In this regard, the control power supply 412 is coupled between the input filter/rectifier 404 and the pulse width modulated control circuit 410.

Figure 5:
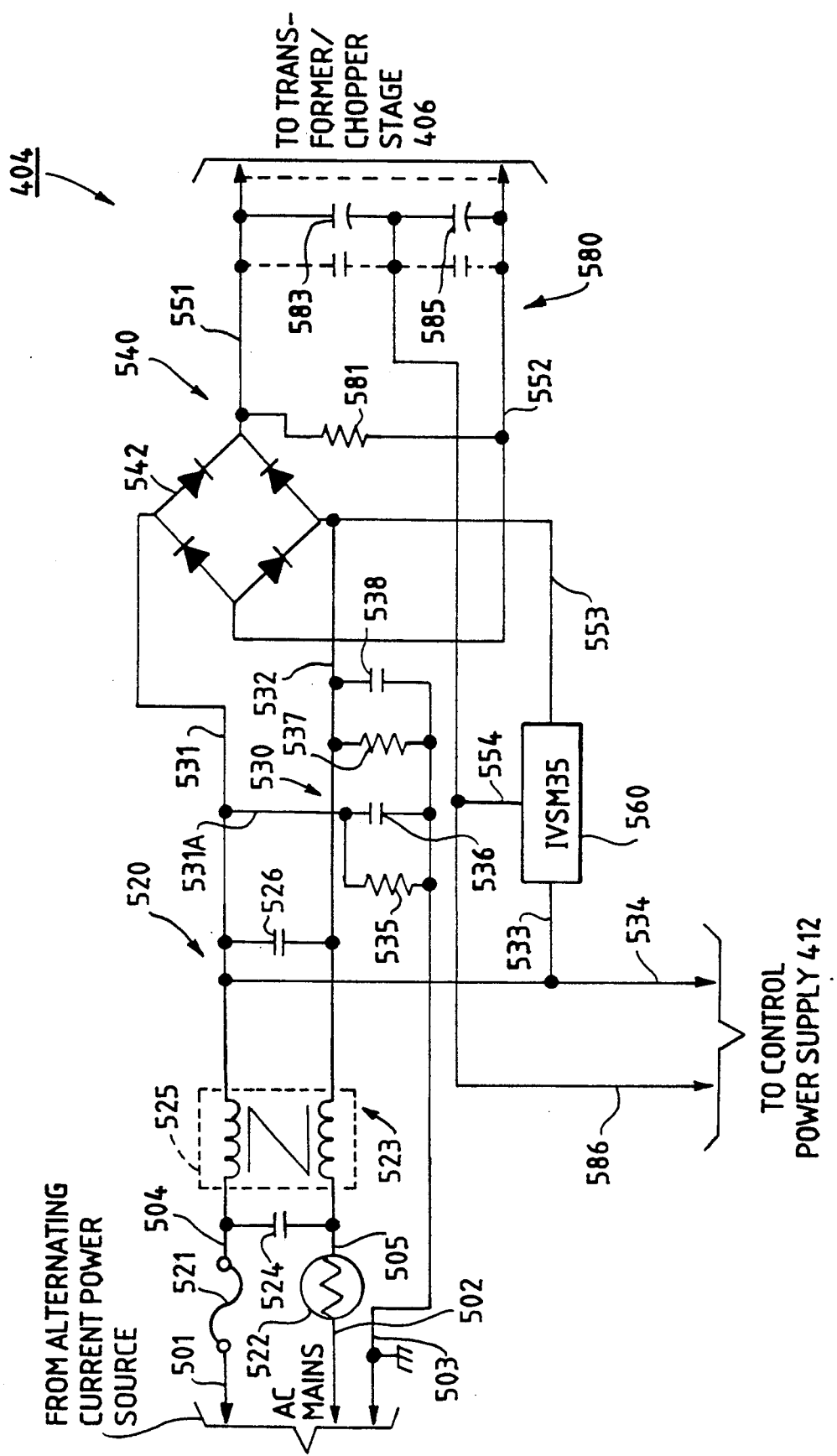
FIG. 5 is a schematic diagram of the input filter/rectifier of the power unit of FIG. 4.

Considering now the input filter/rectifier 404 in greater detail with reference to FIGS. 4 and 5, an alternating current power source (not shown) supplies alternating current at a voltage of 110 VAC or 220 VAC +10% and with a frequency of 60 cycles per-second to the input filter rectifier 404 on lines 501, 502 and 503 respectively. The input power is coupled to a rectifier filter assembly shown generally at 540, for rectifying the input voltage into via a direct current high voltage source. For the purpose of protecting the rectifier filter assembly 540 from transient power surges on the input power lines the input filter rectifier 404 also includes a conventional power protection network 520 that is well known to those skilled in the art.

For the purpose of converting the input filter/rectifier 404 into a voltage doubler which cause the alternating current voltage on lines 501, 502 and 503 to be multiplied into a direct current voltage across leads 551 and 552, the input filter/rectifier 404 includes a voltage doubler selector module 560 (FIG. 5) that is coupled between the power protection network 520 by leads 533 and 534 and the rectifier filter assembly 540 by leads 553 and 554. The doubler module 560 is manufactured by Enpower Corporation under part number IVSM35. This voltage doubling technique is familiar to those skilled in the state of the art of constructing power supplies and will not be explained hereinafter in greater detail. It should be noted however, that if the incoming line voltage is 220 VAC, instead of 110 VAC, the voltage doubler selection module 560 is disconnected from the input filter/rectifier 404 and does not perform the voltage doubling function. In this case, the 220 VAC input voltage is merely rectified by the rectifier filter assembly 540. In either case, approximately the same direct current high voltage results typically between 250 VDC and 350 VDC as a voltage source for the transformer/chopper stage 406.

Considering now the power protection network 520 in greater detail with reference to FIG. 5, the power protection network generally includes a fuse 521 for protecting the input filter/rectifier 404 in the event of a short circuit in the power unit 22. Fuse 521 is connected between lead 501 and a conventional LC network 523 by lead 504. A thermistor 522 is also connected between lead 502 and the LC network 523 by lead 505 for protecting the input filter/rectifier from current surges on the input line 502. In this regard, the thermistor 522 has a temperature dependent resistance, such that it places a resistive load in series with the ac power source when at room temperature and a much smaller load at higher temperatures. Accordingly, during the initial application of electrical power to the input filter/rectifier 404 the thermistor 522 limits the inrush current surge which charges the series connected capacitors 583 and 585 coupled across the output of the assembly 540. Under steady state conditions, as the operating temperature of the thermistor 522 increases, the resistance of same decreases to limit power dissipation as is traditionally practiced in the state of the art. Fuse 521 is a 250 volt, 5 ampere fuse and thermistor 522 is 4 ampere thermistor whose resistance varies between 5 ohms and 0.5 ohms as a function of temperature.

The LC network 523 is a conventional "pi section filter" and presents a high impedance path between the power unit 22 and the line voltage source for common mode high frequency noise voltages produced during the normal operation of the power unit 22. This high impedance is required in order to prevent common mode, internally generated power unit electrical noise from interfering with the operation of other electrical equipment connected to the line source. The LC network 523 includes a parallel connected capacitor 524, a common mode choke 525 and a capacitor 526. Both the capacitor 524 and the capacitor 526 are: 0.1 microfarad 250 VAC capacitor, while choke 525 in a 4 mh inductor. As is well known in the state of the art, choke 525 possesses leakage inductance sufficient to limit some differential noise. Thus, the choke 525 in conjunction with the capacitors 524 and 526 provide a high impedance path between the power unit 22 and the line source for differential mode high frequency noise voltages generated by the power unit 22.

In order to provide a leakage current path (as required by the Underwriter's Laboratories safety standards required for power supplies) the input filter/rectifier also includes a discharge network shown generally at 530. The discharge network 530 includes a parallel connected resistor 535 and capacitor 536 connected between the ground by lead 503 and the positive output of the LC network 523 by lead 531A and a parallel connected resistor 537 and capacitor 538 connected between ground by lead 503 and the negative or neutral output of the LC network 523 by lead 532. The resistor 535 and 537 are both 470 K ohm resistors while the capacitor 536 and 538 are both 0.01 farad 1 Kvolt capacitors.

Considering now the rectifier filter assembly 540 in greater detail with reference to FIG. 5, the rectifier filter assembly generally comprises a conventional bridge rectifier 542 that is coupled between the power protection network 520 and the transformer/chopper stage 406 by leads 531 and 532 and leads 551 and 552 respectively. The bridge rectifier 542 is a 400 volt, 4 amp bridge rectifier. The rectifier filter assembly 540 includes a smoothing network 580 for reducing ripple in the output voltage. The smoothing network 580 is connected across leads 551 and 552 and includes a resistor 581 that is connected in parallel with a pair of series connected capacitors 583 and 585 respectively. The resistor 581 is a 200K ohm resistor and capacitors 583 and 585 are both polarized 1000 $\mu$farad capacitors.

As best seen in FIG. 5, the input filter/rectifier 404 also supplies power to the control power supply 412 on leads 534 and 586 respectively.

Figure 6:
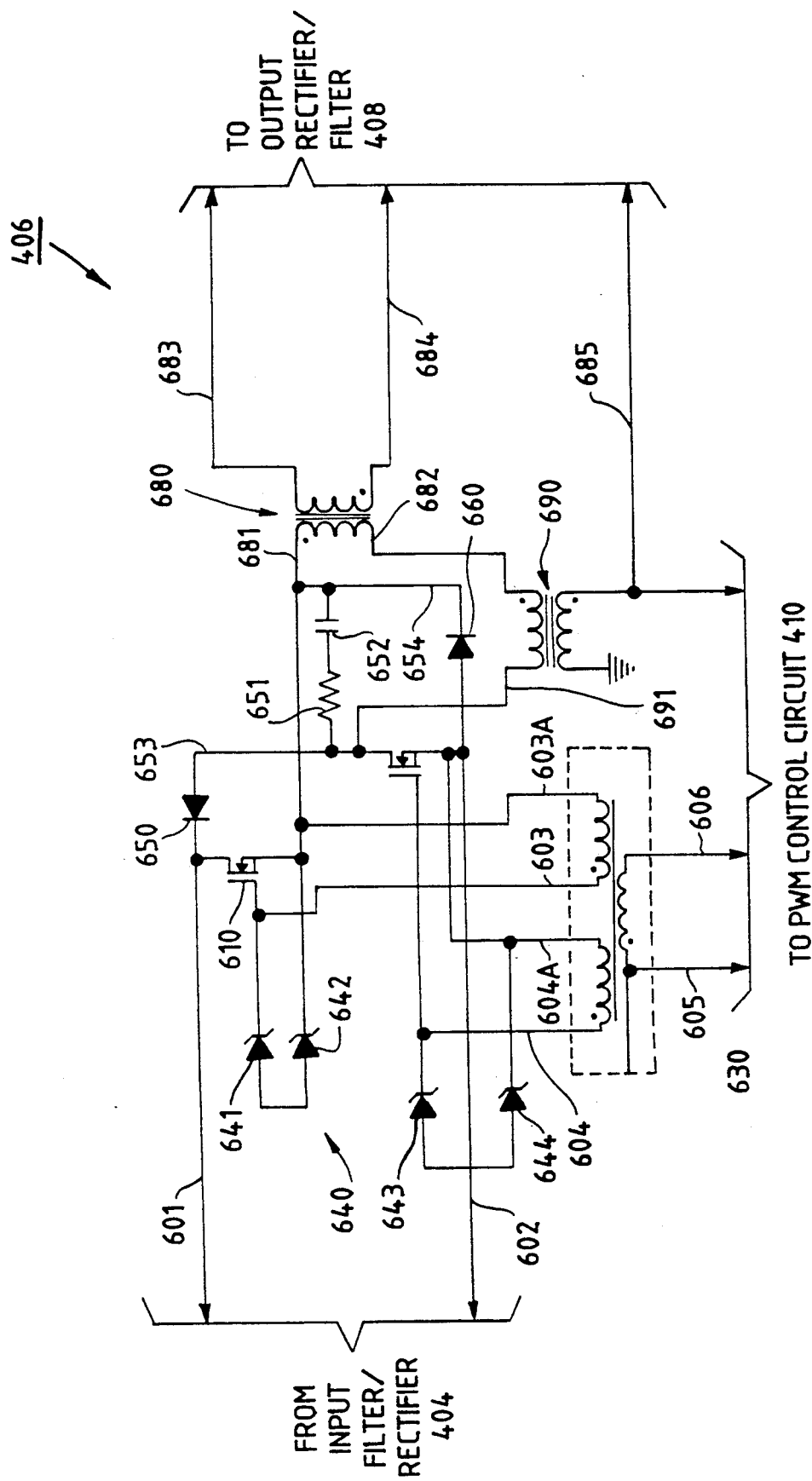
FIG. 6 is a schematic diagram of the transformer chopper stage of the power unit of FIG. 4.

Considering now the transformer/chopper stage 406 in greater detail with reference to FIGS. 4 and 6, the transformer chopper stage 406 in response to a power control signal generated by the pulse width modulated control circuit 410 across lines 605 and 606 converts the direct current high voltage supplied by the input filter rectifier 404 into low voltage, high current power as a source of electrical energy for heating the thermod blade 13 to a desired thermod temperature (HT1).

The transformer chopper stage 406 generally comprises a pair of power mosfet transistors 610 and 620 for providing a chopped high frequency voltage to the primary windings of a power transformer 680. Transformer 680 steps down the voltage through its secondary windings across leads 683 and 684 to provide a chopped voltage to the output filter rectifier 508. The resistor 610 and 620 are connected to the input filter rectifier 404 by leads 601 and 602 respectively. The input gates of the transistors 610 and 620 are connected by leads 603 and 603A and 604 and 604B to the secondary winding of a transformer 630 whose primary winding is coupled to the pulse width modulated control circuit 410 by leads 605 and 606 respectively. The transistors 610 and 620 are both MTH 13N45 mosfets manufactured by Motorola Corporation, while Transformer 630 is an EP-PT5 transformer the design procedure for which is well known to those skilled in the art.

In operation, transistors 610 and 620 switch to a low impedance path between drain and source terminals upon application of between 5 to 20 volts across the gate source terminals. In order to limit the accidental application of more than the absolute voltage rating (20 volts) to the gate-source terminals of transistors 610 and 620 a zener diode network 640 present a low impedance short to the gates of the transistors 610 and 620 at voltages above 16 volts. The resulting current flow in series with transistor 610 and 620 through the primary winding of transformer 680 as a pulsed current in phase with the 100 kilohertz drive signal applied to the drive transformer 690.

In this regard, during positive excursion periods of the gate-source drive voltage provided via transformer 690, current flow increases in the primary winding of transformer 680 according to the well known formula:

$$I = V*dt/L$$

where V is the direct current high voltage output and L is the inductance in microchenries of the primary winding of transformer 690.

Thus, energy stored as magnetic flax density in the magnetic core of transformer 680 increases proportionally to the magnitude of "I squared."

During the negative excursion periods of the gate-source drive voltage provided via transformer 690, the transistors 610 and 620 present a high impedance source to the primary winding current "I" which in order to maintain the magnetic flux within the core of transformer 680 must either continue flowing through the alternate path via a pair of diodes 650 and 660 or in the form of an image current Ii through the secondary winding of transformer 680. In this regard, during the first approximate 100 nanoseconds of each negative excursion, primary current I flows through diodes 650 and 660 respectively due to a phenomenon known as leakage inductance which prevents instantaneous formation of the image current Ii in the secondary winding of transformer 680. Thus, diodes 650 and 660 provide alternate current paths that limit the peak voltage across transistor 610 and 620 to that of the direct current high voltage supplied by the input filter rectifier 404 plus the instantaneous forward voltage drop of the diodes 650 and 660. It should be understood that this arrangement is necessary to prevent otherwise destructive voltage spikes which would otherwise destroy transistors 610 and 620 and permits the use of a transformer having a high leakage inductance, such as the transformer 680.

When the magnetic energy stored in transformer 680 is released from its secondary winding, the resulting image current Ii flows from the secondary winding of transformer 680 into the output filter rectifier 408 as a 100 kilohertz pulse train with a pulse width determined by the off time of transistors 610 and 620. In this regard, it should be understood that the pulse width modulated control circuit 410 causes the transistors 610 and 620 to be switched on and off at a very rapid frequency of 100 kilocycles via the switching transformer 630. In this regard, the control circuit 410 provides a generally rectangular shaped voltage waveform of 14 to 16 volts peak amplitude at a frequency of 100 kilohertz to the primary drive windings of transformer 630. Transformer 630 in turn, via its secondary windings couples this control signal to the gate-source pins of transistors 610 and 620 by leads 603, 604 and 603A, 604A, respectively. During the period that the transistor 610 and 620 are switched on, current flows through the transistors 610 and 620 and through the primary winding of the transformer 680, causing a magnetic field to be built up in transformer 680. When the transistors 610 and 620 are switched off, the magnetic energy stored on transformer 680 is released from the secondary winding of the transformer 630 into the output rectifier/filter 408.

As best seen in FIG. 6, for the purpose of disabling the power unit 22, the transformer/chopper stage 406 includes a coupling transformer 690 that enables the power transformer 680 to conduct current through its primary winding for permitting a sensed ground referenced signal generated through the primary winding of the transformer 680 to be coupled to the pulse width modulated control circuit 410. In this regard, the current sensed in the primary transformer 690 is coupled to the control circuit 410 via lead 607 and to the output rectifier/filter 408 on lead 685. It should be noted that transformer 690 substantially reduces the current coupled to the control circuit 410; i.e by a factor of 50. The coupling transformer 690 has its secondary winding connected to the primary winding of transformer 680 by lead 682 and the anode of diode 650 by leads 653 and 691 respectively.

Considering now the output rectifier/filter 408 in greater detail with reference to FIGS. 4 and 7, the output rectifier/filter 408 generally comprises a schottky diode rectifier 720 and a capacitor filter assembly 740 for providing a relatively smooth direct current voltage containing a small amount of alternating current ripple. For the purpose of reducing the amount of alternating current ripple from the output of the output rectifier filter 408, a conventional LC filter network 760 is coupled between the capacitor filter assembly 740 and the heater element 15.

In operation, the output rectifier filter 408 accepts the pulsed image current (Ii) from the transformer chopper stage 406 permitting the capacitors in the capacitor filter assembly 740 to be charged. The LC filter network 760 converts the pulsed image current to a steady direct current output current that drives the heating element 15 of thermod 12 causing the temperature of the thermal blade 13 to rise at a time rate that is substantially proportional to the power into the element 15.

As best seen in FIG. 7, the LC filter network 760 has its input connected to the capacitor filter assembly 740 by leads 750 and 751 respectively and its output to the heater element 15 on leads 770 and 771 respectively.

Considering now the schottky diode rectifier 720 in greater detail with reference to FIG. 7, the rectifier 720 includes a set of parallel connected diodes 721-725 that are further connected in parallel with a pair of RC networks 730 and 735 respectively. Diodes 721-725 are connected in parallel in order to have sufficient current handling capability, but one skilled in the art would recognize that a single large schottky diode rectifier could conceptually work as well. The schottky rectifier 770 is a 90 volt, 20 amperes schottky.

Considering now the resistor network 730 and 735 in greater detail with reference to FIG. 7, the RC network 730 includes a resistor 731 connected in series with a capacitor 732. Resistor 730 is connected across the anodes of diodes 721-725 to the input from the transformer chopper stage on lead 701. The capacitor 732 is connected across the cathodes of diodes 721-725 to the input of the capacitor filter assembly 740 by lead 702. In a similar manner, the RC network 735 includes a resistor 736 that is connected in series with a capacitor 737. Resistor 736 is connected across the anodes of diodes 721-725 by leads 701 and 703 respectively. The capacitor 737 is connected across the cathodes of diodes 721-725 by leads 702 and 704 respectively. Resistors 731 and 736 are both 33 ohm, 3 watt resistors while capacitors 732 and 737 are both 0.01 farad 200 volt capacitors.

The capacitor filter assembly 740 helps eliminate alternating current ripple from the rectified output voltage from the schottky diode rectifier 720. Capacitor filter assembly 740 includes a set of parallel connected capacitors 741-743 connected between leads 750 and 751. Capacitor 741-743 are substantially identical, each being a 470 farad, 35 volt capacitor. In addition, the capacitor filter assembly 740 also includes a capacitor 744 connected by lead 711 to the output lead 750 of the LC filter 760 ground via lead 706 for filtering ripple on lead 750 and a capacitor 745 connected between lead 751 and ground via lead 707 for filter ripple on lead 751. Capacitors 744 and 745 are both 0.01 farad 1 kilovolt capacitors.

The LC filter network 760 further filters to eliminate ripple on the output of the output rectifier filter 408 and to couple the output voltage to a sensing network 790, which will be described hereinafter in greater detail. The LC filter network includes an inductor 761 connected between the schottky diode rectifier on lead 750 and the heating element 15 on lead 770. Inductor 761 is a 1$\mu$ henry 100 ampere inductor. A set of capacitors 762-764 are connected in parallel across the heating element 15 to further filter ripple from the output voltage. Capacitors 762-764 are substantially identical, each being a 470 farad, 35 volt capacitor.

In order to sense the output current for the sensing network 790, the LC filter network 760 also includes an inductor 765, which has its primary winding connected between the capacitor filter assembly 740 on lead 751 and the capacitor 762-764 on lead 771. The core of inductor 765 is coupled to a hall effect sensor 780 which will be described hereinafter in greater detail.

The output rectifier/filter 408 also includes a mode selection network 770, which enables the power unit 22 to be operated in one of three selected modes of operation. In this regard, the mode selection network 770 includes a mode selector switch 772 having three selection contact nodes or positions 772I, 772V, and 772P which may be manually selected by a user of the apparatus 10. If switch 772 is placed in position 772P, the power supply unit 22 operates in the power proportional mode so that the output power of unit 22 is proportional to the error output signal of the error amplifier 52.

The switch 39 permits the output power of the power unit 22 to be sensed and enables the output power from the control unit 23 to serve as the negative feedback signal. For the purpose of sensing the output power, a hall effect sensing arrangement 790 is provided to multiply electronically the sensed output voltage by the sensed output current as will be explained hereinafter in greater detail.

If switch 772 is placed in position 772I, the power unit 222 operates in the current proportional mode so that the output current of the power unit 22 is proportional to the error output signal of the error amplifier 52.

The switch 39 causes the output current of the power unit 22 to be sensed, and enables the output current from the control unit 23 to serve as a negative feedback signal. For the purpose of sensing the output current, a current transformer 690 (FIG. 6) is placed in series with the primary winding of the power transformer 680. In this configuration, the peak current flowing through the primary winding of transformer 690 is approximately proportional to the steady state output current of the control unit 23 which is reflected in the secondary winding of transformer 690 as an image current of 1/50th of the magnitude of the primary winding current. This image current generates a peak sensing voltage, which is proportional to the output current of the control unit 23, across a sense resistor 651 (FIG. 6) which is integrated slightly by a capacitor 652 to help filter out high frequency noise. The sensed voltage is applied through a diode 774 (FIG. 7) by leads 685 (FIG. 6) and 774B (FIG. 7) to a simple peak/average detector network 776 that helps to generate the feedback signal. The detector network 776 includes a resistor 777 connected in parallel with a capacitor 778 between ground by lead 779 and contact 772I of the switch 39 by leads 774A. The cathode of diode 774 is also connected to contact 772I by lead 774A to permit the feedback signal to be coupled to the switch 39.

If switch 772 is placed in the 772V position, the power unit 22 operates in the voltage proportional mode so that the output voltage of the power unit 22 is proportional to the error output signal of the error amplifier 52.

The switch 39 causes the output voltage of the power unit 22 to be sensed, and enables the output voltage from the control unit 23 to serve as a negative feedback signal. For the purpose of sensing the output voltage from the output rectifier/filter 408, a pair of sensing wires 501 and 502 are connected electrically to the element 15 independently of the output leads 770 and 771. The sensing wires 501 and 502 compensate for voltage drop in the lead wires 770 and 771. Additionally, a pair of sensing resistor 785 and 786 provide an emergency voltage sensing path in the event that one of the remote voltage sense lead (501 or 502) become disconnected.

Each of the three switch positions 772I, 772P, and 772V thus provides a selected method of closed loop temperature control where the closed loop control is provided by the control unit 23. In this regard, it should be understood that the microprocessor 20 functions only to provide the temperature control signal while the power unit 22 couples power to the thermod heating element 15.

Considering now the hall effect sensing network 790 in greater detail with reference to FIG. 7, the sensing network 790 senses the output power from the output rectifier/filter 408 by the combination of a hall-effect sensor 780 and operational amplifier 782 whose output voltage is proportional to the electrical load power. The hall-effect sensor 780 generates an output voltage which is proportional to an applied bias current (Ii) as a function of the magnetic field resulting from the current through the physically adjacent inductor 765.

Ii is proportional to the second output voltage ($V_o$) sensed between leads 791 and 794C as a function of the conductance of resistor 784.

More particularly, the sensor 780 also accepts a magnetic field (B), obtained by placing the sensor 780 in contact with the cross-section of the magnetic core of inductor 765 so that a magnetic field is applied to the sensor 780 which is proportional to the output current $I_o$ and the bias current Ii. Therefore, sensor 780 provides at its output on leads 794 and 794A a voltage proportional to the magnetic field multiplied by the bias current, both of which are proportional to the output current and voltage respectively of the control unit 23 and thus, also proportional to its output power level.

The sensing arrangement 790 also includes an operational amplifier 782 configured in a unity gain buffer amplifier stage for applying the resulting signal to contact 772P of the switch 39. Switch 39 thus permits this signal to be applied as a feedback signal that is proportional to the power output of the control unit 23. The signals from the hall effect sensor 780 are coupled to the operational amplifier 782 via a pair of resistors 783 and 786 respectively. A unity gain feed back path is provided to the amplifier 782 by a resistor 784 that connected between the output of the amplifier by lead 797 and the negative input to the amplifier 782 via leads 796 and 796A respectively. Resistor 784 is a 1 Kohn resistor while amplifier 782 is an LM 358.

It should be noted with reference to FIG. 7, that in The voltage proportional mode, the output of amplifier 782 is disconnected from the pulse width modulated control circuit 410 to permit the hall effect voltage from sensor 780 to be coupled directly to the switch 770 via resistor 784 by lead 793.

Considering now the pulse width modulated control circuit 410 in greater detail with reference to FIG. 4 and FIG. 8, the pulse width modulated control circuit 410 controls the power output of the flyback converter 402 by modulating the duty cycle of the power mosfet drive wave form. In this regard the pulse width modulated control circuit 410 includes a controller 810 that is coupled between the transformer/chopper stage 416 and the output rectifier/filter 408 as will be explained hereinafter in greater detail.

The control circuit 410 in response to the feedback signal received from the flyback convertor 402 and the control signal received from the control unit 23 generates a power control signal that is coupled to the transformer/chopper stage 406 to cause the electrical power, voltage or current of the flyback converter 402, depending on the position of the mode selection switch 39, to be proportional to the control signal generated by the control unit 23.

Considering now the controller 810 in greater detail with reference to FIG. 8, the controller 810 is a conventional SG 3525 module such as manufactured by SILICON GENERAL and includes a negative error amp input designated as —IN which is coupled to the sensed power-voltage (Vp) from the sensor 780 via a 75K ohm resistor 812 that is connected between the —IN input by leads 880 and 880A and the output rectifier filter 408 by lead 881. The controller 810 also includes a positive error amp input designated as +IN which is coupled to the control signal ($V_{CT}$) generated by the control unit 23 via leads 882 and 882A respectively. The control signal ($V_{CT}$) is referenced to the ground reference of sensor 780 and is proportional to the desired output power that is to be provided to the heater element 15.

Considering now the operation of the pulse width modulated control circuit 410 in greater detail with reference to FIGS. 4, 7 and 8, the pulse width modulated control circuit 410 receives or senses the feedback signal (Vfb) from the output rectifier/filter 408 via the switch 39. The feedback signal is coupled to the controller 810 via a resistor 812 that connected between the switch 39 via lead 881 and the −IN input to the controller 810 via leads 880A and 880 respectively. The power control signal generated by the control unit 23.

Controller 810 also functions in such a manner that correct operation normally requires that the voltages received on terminals (+IN) and (−IN) be greater than +1.5 volts or less than +5.1 volts referred to ground on the GND terminal. To that end a pair of IN4148 series connected diodes 840 and 841 in concert with a 2K ohm bias resistor 842 and a 0.1 farad noise filter capacitor 843 comprise a shunt type voltage regulator to set a minimum reference ground voltage. Negative voltage references for the control unit 23 and feedback signal Vfb are referenced to the reference ground voltage in order to maintain the correct minimum common mode voltage of 1.5 volts at the (+IN) and (−IN) terminals. In order to provide a negative gain in Vfh to limit the common mode voltage range at the (IN) terminal to less than 5.1 volts a resistors 8b5 is connected between resistor 842 by lead 855A and the resistor 812 by leads 885B and 880A respectively.

For the purpose of providing a 100 kilohertz output signal from the control circuit 410, a 20K ohm resistor 844 and a 220 pfarad capacitor 845 are connected in series between ground by level 828A and the (R) input of the controller 810 by lead 828B.

For the purpose of protecting the flyback converter 402 from sudden surges in start up current and to enable the flyback converter 402 to operate with a gradually increasing pulse width signal, a 0.1 farad start control capacitor 830 is coupled between the (ss) input to controller 810 by lead 831 and ground by lead 832.

In order to reduce the sensitivity of the control circuit 410 to control instabilities and electrical noise and to provide loop gain compensation as is traditionally practiced in the state of art, the control circuit 410 also includes a compensation network 850 is coupled across the controller 810 between its (COMP) terminal by lead 851 and its (−IN) input by lead 880. The compensation network includes a 100pfarad capacitor 852 connected in parallel with a series RC circuit that includes a 10K ohm resistor 853 and a 0.047 farad capacitor 854.

For the purpose of permitting an operator to manually adjust the power unit output in the event that the control unit 23 is disabled, the control circuit 410 also includes a 100K potentiometer 889 connected between resistor 842 by lead 890, the VREF terminal of controller 810 by lead 891, and a 10K ohm resistor 892 by lead 893.

To increase the output current drive capability of the controller 810 a two totem-pole driver stage 859 consisting of transistor pair 860, 861, 862 and 863 is also included in the control circuit 410. The output of the driver 859 is coupled to the transformer/chopper stage by lead 864 while the input to the driver 859 is coupled to the OUTA and OUTB terminals of controller 810 by leads 865 and 866 respectively. For the purpose of providing a clamping current path for magnetization currents in the primary winding of transformers 630 (FIG. 6) a set of diodes 860A, 861A, 862A and 863A are also included in the driver stage 859.

The control circuit 410 also includes a pair of 0.1 micro-farad capacitors 870 and 871 to provide electrical noise decoupling to reduce sensitivity of the control circuit 410 to control instabilities and electrical noise. Capacitor 870 is coupled between ground by lead 872 and the (V+) and (VC) terminals of the controller 810 by lead 873. Capacitor 871 is coupled between ground on lead 872 and the (VREF) terminal of controller 810 by lead 874.

As best seen in FIGS. 6 and 8, the sense ground referenced generated by the transformer/chopper stage 406 on the lead 607 is coupled to the anode of a diode 820 by lead 825. In order to provide a voltage signal to the (DIS) input of the controller 810 which is proportional to the time integral of the current through the transformer 690 primary the cathode of diode 820 is connected to a parallel current RC network 822 by lead 826 and to the DIS input of the controller 810 by lead 826A. The RC network 822 is coupled to ground by leads 828 and 828A and includes a resistor 823 and a capacitor 824. The resistor 823 ia a 4.64 ohm resistor and capacitor 824 is a 470 picofarad capacitor.

It should be noted that should the current through the primary transformer 690 exceed approximately 13 amperes the voltage across the RC network 822 will exceed the threshold voltage for disabling the controller 810. In this regard, when the controller 810 is disabled a capacitor 830 is discharged via the controller 810. When the capacitor 830 is discharged after a period of time determined by the capacitance of capacitor 830, the controller 810 is once again unable to continue normal operation. The capacitor 830 is coupled between the controller 810 by lead 830 and ground by leads 828 and 832 respectively.

Figure 9:
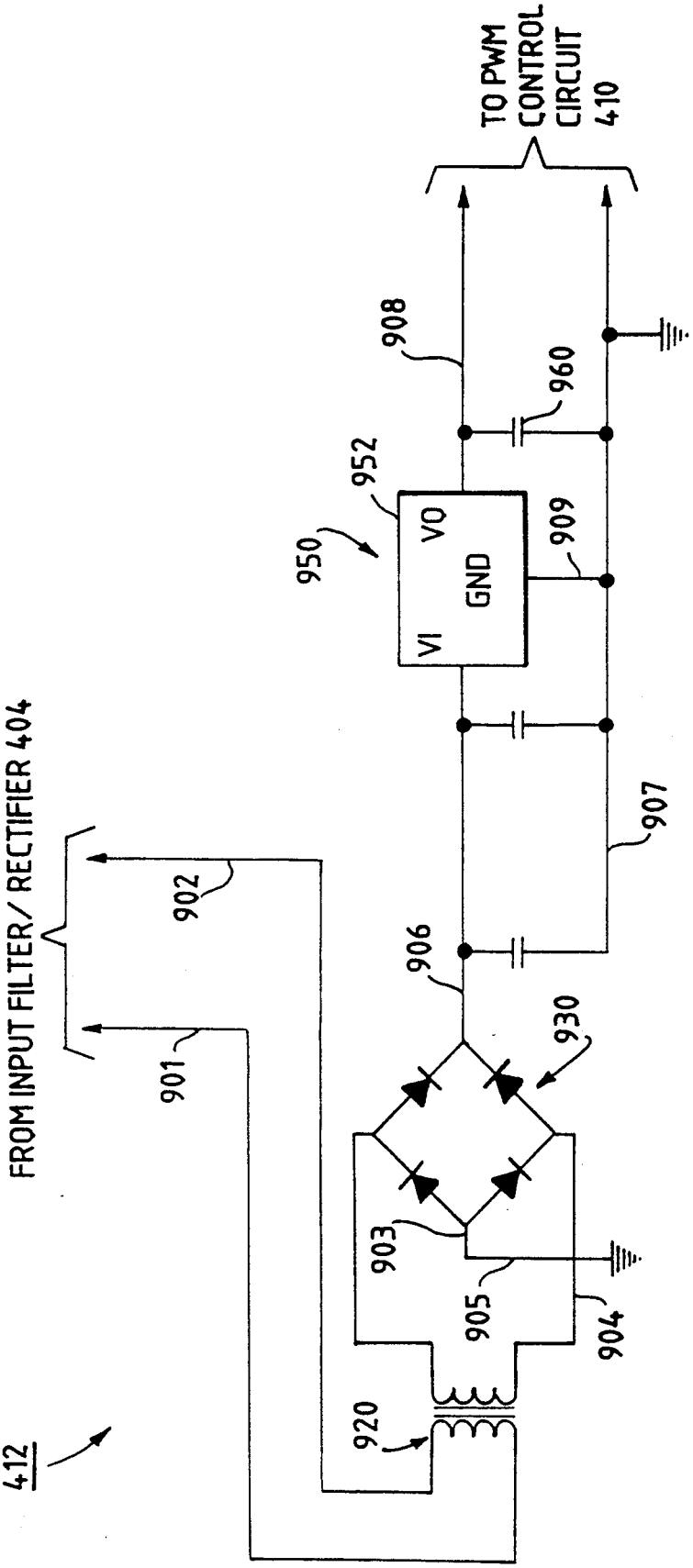
FIG. 9 is a schematic diagram of the control power supply of the power unit of FIG. 4.

Considering now the control power supply 412 in greater detail with reference to FIG. 9, the control power supply 412 provides the power for the control circuit 410 and includes a transformer 920 that is coupled to the alternating current line voltage via the input filter rectifier 404 on leads 901 and 902 respectively. Transformer 920 converts the 110 VAC 60 cycle voltage into 12 VAC at 60 cycles.

In order to convert the converted transformer voltage from transformer 920 into a direct current voltage source, the control power supply 412 also includes a bridge rectifier 930 and voltage regulator arrangement 950. The secondary winding of the transformer 930 is connected across the bridge rectifier 930 by leads 903 and 904. The bridge rectifier 930 is a conventional 50 volt, 1 ampere rectifier. The bridge rectifier is also connected between ground on lead 905 and the input to the voltage regulator arrangement 950 by lead 906.

Considering now the voltage regulator arrangement 950 in greater detail with reference to FIG. 9, the voltage regulator arrangement 950 includes a linear voltage regulator 952 for regulating the direct current output voltage from the bridge rectifier 930 into a 12VDC source. The voltage regulator 952 includes an input VI and an output VO and is connected to ground by lead 909. The voltage regulator 952 is an LM7812 manufactured by National Semiconductors.

For the purpose of eliminating alternating current ripple on the output voltage from the control power supply 412, the voltage regulator arrangement 950 includes a set of input filter capacitors 942 and 944 that are connected in parallel between ground on lead 907 and the input path to the voltage regulator 952 on lead 906. Capacitor 942 is a 25 volt, 470 picofarad capacitor while capacitor 944 is a 0.25 volt, 0.1 picofarad capacitor. To further filter ripple from the output voltage of the control power supply 412, the voltage regulator arrangement 950 also includes an output filter capacitor 960 that is connected between the +12VDC output of the voltage regulator 952 on line 908 and ground on line 907. Capacitor 960 is a 25 volts, 0.1 picofarad capacitor.

As best seen in FIGS. 5 and 9, the primary winding of transformer 920 (FIG. 9) is connected between the alternating current line voltage via leads 534 and 901 and between capacitors 583 and 585 (FIG. 5). In this regard, when the voltage doubler selector unit 560 (FIG. 5) is turned on, transformer 920 is connected in effect directly across the incoming alternating current power line. However, in the event the power unit 22 is being powered by an alternating current 220 volt line voltage the selector unit 560 is turned off to connect the transformer 920 between capacitors 583 and 585 and the incoming alternating current input line but not across the alternating current line 501 and the neutral line 503. In this regard, transformer 73 is effectively coupled to a 110 VAC source. This coupling technique is well known to those skilled in the art.

Considering now the temperature control module 21 in greater detail with reference to FIG. 10, the temperature control module 21 begins in a start instruction 1001 and proceeds to a command instruction 1003 that retrieves the temperature profile data for a given reflow soldering operation, such as the temperature profile shown in FIG. 2. After the temperature profile data has been retrieved, the program proceeds to a command instruction 1005 to set the temperature command output in the microprocessor 20 to the preheat temperature level for a first time period $t_1$. In this regard, an output tier (not shown) is set for the required period of time for preheating the leads of an electronic device (not shown). The program then proceeds to a command instruction 1007 that sends the temperature command signal ($V_{CT}$) to the control unit 23.

After sending the temperature command signal ($V_{CT}$) to the control unit 23, the temperature control module 21 proceeds to a decision instruction 1009 to determine whether the output timer has elapsed. If the timer has not elapsed the program proceeds to a decision instruction 1011 to determine whether the thermod blade 13 has reached the command temperature T1. If the thermod blade 13 has not reached the commanded temperature level, the program proceeds to a decision instruction 1012 to determine whether an error sense signal has been sent by the control unit 23. If no error signal has been received, the program returns to the command instruction 1007 and proceeds as previously described. If an error signal has been received, the program advances to a command instruction 1014 and sends the temperature limit signal to the control unit 23. After sending the limit signal to control unit 23, the program advances to an exit command 1015. While the above described program sequence is for only one blade of the reflow soldering head 11, it should be understood that substantially similar routines are executed in unison for each of the thermod blades associated with the soldering head. As these routines are substantially similar they will not be described hereinafter in greater detail.

Referring again to FIG. 10, if the output timer has elapsed at instruction 1009, the program proceeds to a decision instruction 1013 to determine whether the entire temperature profile data for blade 13 has been sent to the control unit 23. If the entire profile sequence has been sent the program proceeds to the exit instruction 1015. If the entire profile has not been sent, the program advances to command instruction 1016 and sets the next temperature command level in the temperature profile, such as temperature levels (T2−T1) for a new time period $t_2$. The program then advances to decision instruction 1018 to determine whether the temperature command requires the temperature to be increased at a specific rate.

If it is determined that a rate increase is not required the program returns to instruction 1007 and proceeds as previously described. If at the decision instruction 1018 it is determined that a rate increase is required the program goes to a command instruction 1020 that causes the temperature command signal to be incremented at the determined rate. The program then returns to command 1007 and proceed as previously described.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. Soldering system controlled power supply apparatus for heating thermod elements, comprising:
   means for generating a plurality of different types of substantially constant electrical energy;
   means for selecting only one of said plurality of different types of constant electrical energy and for causing said generating means to heat a selected one of the thermod elements with the selected type of constant electrical energy;
   means for storing a plurality of different thermod element heating profile signals, said profile signals being indicative of a temperature profile having at least two different desired thermod temperature levels at different time periods during a given soldering process;
   means for sensing the temperature of the selected thermod element; and
   temperature control means responsive to said means for sensing and to a selected one of said thermod element heating profile signals for adjusting the temperature of the selected thermod heating element so that its temperature substantially conforms to a desired temperature profile over a selected period of time.

2. Soldering system controlled power supply apparatus according to claim 1, wherein said means for generating includes:
   means for generating a constant current to energize electrically at least one constant current thermod heating element;
   means for generating a constant voltage to energize electrically at least one constant voltage thermod heating element; and
   means for generating a constant power to energize electrically at least one constant power thermod heating element.

3. A soldering apparatus according to claim 1, further comprising:
   reflow soldering means for transferring thermal energy to an object of soldering material;
   said reflow soldering means including a reflow solder head for converting the selected type of constant electrical energy into thermal energy for transferring said thermal energy to said soldering material.

4. A soldering apparatus according to claim 3, wherein said reflow soldering head includes heating element means coupled to said generating means and a plurality of heating blades in thermal communication with said heating element means for transferring thermal energy to said soldering material.

5. A soldering apparatus according to claim 4 wherein said heating element means is both electrically and thermally conductive.

6. A reflow soldering apparatus according to claim 4, wherein said heating blades are thermally conductive and electrically insulative.

7. Soldering system controlled power supply apparatus according to claim 1, wherein said means for generating includes:
   means for generating a constant current to energize electrically at least one constant current thermod heating element; and
   means for generating a constant voltage to energize electrically at least one constant voltage thermod heating element.

8. Soldering system controlled power supply apparatus according to claim 1, wherein said means for generating includes:
   means for generating a constant current to energize electrically at least one constant current thermod heating element; and
   means for generating a constant power to energize electrically at least one constant power thermod heating element.

9. Soldering system controlled power supply apparatus according to claim 1, wherein said means for generating includes:
   means for generating a constant voltage to energize electrically at least one constant voltage thermod heating element; and
   means for generating a constant power to energize electrically at least one constant power thermod heating element.

10. A method for controlling the temperature of thermod element means, comprising:
    generating a plurality of different types of constant electrical energy;
    selecting only one of said plurality of different types of constant electrical energy to heat the thermod element means with the selected type of constant electrical energy;
    storing a plurality of different thermod element heating profile signals, said profile signals being indicative of a temperature profile having at least two different desired thermod temperature levels at different time periods during a given soldering process;
    sensing the temperature of the thermod element means; and
    responding to a selected one of said thermod element heating profile signals and to the temperature of the thermod element means by adjusting the temperature of the thermod element means so that its temperature substantially conforms to a desired temperature profile over a selected period of time.

11. A method for controlling the temperature of thermod element means according to claim 10, further comprising:
    generating at least one of a plurality of different types of electrical energy; and
    selecting only one of the different types of electrical energy to energize electrically the thermod element means.

12. A method for controlling thermod heating elements according to claim 11, further comprising:
    using heating means to heat the heating elements of a soldering head to a desired temperature;
    measuring the temperature of the soldering head;
    comparing the measured temperature of the soldering head with a desired soldering head temperature for soldering purposes;
    generating an error signal in response to a non-equivalence between said measured temperature and said desired temperature for adjusting the temperature of the soldering head; and
    adjusting said heating means in response to said error signal for generating a desired soldering head temperature.

13. A method according to claim 11, wherein said generating at least one of a plurality of different types of electrical energy includes:
    generating either electrical energy having a constant current, electrical energy having a constant voltage, or electrical energy having a constant power.

14. A power supply apparatus for soldering head means, comprising:
    means for storing a temperature command signal, said signal being indicative of a desired temperature profile for the soldering head means;
    temperature sensing means for generating a signal indicative of the temperature of the soldering head means; and
    temperature control means responsive to the temperature indicative signal and to said temperature command signal for adjusting the temperature of the soldering head means to cause its temperature to conform substantially to said desired temperature profile over a selected period of time so that should the soldering head means temperature deviate from said desired temperature profile, said control means modifies the head means temperature to said desired temperature profile.

15. A power supply apparatus for a soldering head according to claim 14, wherein said temperature sensing means is thermocouple means coupled to the soldering head.

16. A power supply apparatus for a soldering head according to claim 14, wherein said temperature control means includes processor means for determining a desired temperature to heat the soldering head for said selected period of time;
    means for comparing the measured temperature of the soldering head with said desired temperature; and
    said means for comparing in response to a non-equivalence between said measured temperature and said desired temperature generating an error signal indicative of a desired energy change to adjust the temperature of the soldering head to the desired temperature.

17. A power supply apparatus for a soldering head according to claim 16, wherein said processor means includes algorithm means for controlling the temperature of the soldering head in accordance with a predetermined temperature profile over a selected period of time.

18. A power supply apparatus for a soldering head according to claim 17, wherein said algorithm means causes the processor means to generate a control signal that is indicative of a desired soldering head temperature for a predetermined selected period of time.

19. A power supply apparatus for a soldering head according to claim 18, wherein said control signal is a scaled voltage signal that varies as a function of temperature and time.

20. A power supply apparatus for a soldering head according to claim 14, wherein said power means includes means for sensing the amount of electrical energy being coupled to the soldering head; said means for sensing including means for selecting a type of electrical energy to be sensed.

21. A power supply apparatus for a soldering head according to claim 20, wherein said means for selecting includes switching means to select electrical current, electrical voltage or electrical power as said type of electrical energy to be sensed.

22. A power supply apparatus according to claim 13, wherein the soldering head means includes a plurality of thermod heating elements, and wherein said temperature control means includes means for adjusting the temperature of individual ones of the plurality of thermod heating elements independently of one another.

23. A soldering system controlled power supply apparatus, for a plurality of different thermod means, comprising:
   means for heating thermod means;
   means for retrieving selectively individual ones of a plurality of temperature command signals, each individual signal being indicative of a desired temperature profile for one of the plurality of different thermod means;
   temperature sensing means for sensing the temperature of the plurality of different thermod means; and
   means responsive to said temperature sensing means and to at least one of said plurality of temperature command signals for controlling said means for heating to adjust the temperature of the plurality of different thermod means so that their temperatures substantially conform to desired temperature profiles over a selected period of time.

24. A method for controlling the temperature of soldering head means, comprising:
   storing temperature command signal, said signal being indicative of a desired temperature profile for the soldered head means;
   generating a signal indicative of the temperature of the soldering head means;
   using temperature control means for adjusting the temperature of the soldering head means; and
   responding to the temperature indicative signal and to said temperature command signal for adjusting the temperature of the soldering head means to cause its temperature to conform substantially to said desired temperature profile over a selected period of time so that should the soldering head means temperature deviate from said desired temperature profile, said control means modifies the head means temperature to cause it to more closely conform to said desired temperature profile.

* * * * *

UNITED STATES PATENT AND TRADEMARK OFFICE
CERTIFICATE OF CORRECTION

PATENT NO. : 5,260,548

DATED : November 9, 1993

INVENTOR(S) : Todd et al.

It is certified that error appears in the above-identified patent and that said Letters Patent is hereby corrected as shown below:

Column 23, line 15, after "claim", delete "13" and substitute therefor --14--.

Signed and Sealed this

Twenty-fourth Day of May, 1994

Attest:

BRUCE LEHMAN

Attesting Officer

Commissioner of Patents and Trademarks